US010690193B2

(12) United States Patent
Hauck

(10) Patent No.: US 10,690,193 B2
(45) Date of Patent: Jun. 23, 2020

(54) FLEXIBLE COUPLINGS WITH FREE SPIN MODE PREVENTION

(71) Applicant: ATR Sales, Inc., Santa Ana, CA (US)

(72) Inventor: Jerry L. Hauck, Broussard, LA (US)

(73) Assignee: ATR Sales, Inc., Santa Ana, CA (US)

( * ) Notice: Subject to any disclaimer, the term of this patent is extended or adjusted under 35 U.S.C. 154(b) by 455 days.

(21) Appl. No.: 15/477,577

(22) Filed: Apr. 3, 2017

(65) Prior Publication Data

US 2018/0283461 A1 Oct. 4, 2018

(51) Int. Cl.
*F16D 3/68* (2006.01)
*F16D 3/76* (2006.01)

(52) U.S. Cl.
CPC .................................... *F16D 3/68* (2013.01)

(58) Field of Classification Search
CPC ..... F16D 3/56; F16D 3/58; F16D 3/68; F16D 3/76
See application file for complete search history.

(56) References Cited

U.S. PATENT DOCUMENTS 5,139,460 A 8/1992 Hoyt et al.
5,295,911 A 3/1994 Hoyt et al.
5,657,525 A 8/1997 Hoyt et al.
5,738,585 A 4/1998 Hoyt et al.
5,908,355 A 6/1999 Hoyt et al.
6,019,684 A 2/2000 Hoyt et al.
6,024,644 A 2/2000 Hoyt et al.
7,244,186 B2 7/2007 Hauck
7,806,771 B2 10/2010 Hauck

FOREIGN PATENT DOCUMENTS

DE 10 2013 007 126 * 6/2014 .............. F16D 1/06
JP 4256849 * 4/2009 .............. F16D 3/12

OTHER PUBLICATIONS

International Search Report, PCT/US2018/022869 dated Jul. 5, 2018.
Written Opinion of the International Searching Authority, PCT/US2018/022869 dated Jul. 5, 2018.

* cited by examiner

*Primary Examiner* — Michael P Ferguson
(74) *Attorney, Agent, or Firm* — Lapple Ubell IP Law, LLP; Franklin D. Ubell

(57) ABSTRACT

A flexible coupling includes a first hub, a flexible insert having a plurality of exterior lobes and a plurality of interior lobes, a retainer having an interior which engages the exterior lobes of the flexible insert, and a second hub having an exterior surface contoured to engage the interior lobes of the flexible insert. Protruding teeth are formed on wings of the second hub and positioned to engage sidewalls of openings formed in an inner lip of the retainer in the event that the flexible insert tears or shears, thereby preventing the second hub from going into a potentially damaging free spin mode.

16 Claims, 5 Drawing Sheets

25 28 29 21 13 23 76 15 54 36 19 53 74 52 65 161 73 49 28 161 17 161 47 29 44 35 22 27 29 28 76 71 34 55 33 171 73 74 47 43 29 28 161 45

FLEXIBLE COUPLINGS WITH FREE SPIN MODE PREVENTION

BACKGROUND OF THE DISCLOSURE

Field

The subject disclosure pertains to new and improved flexible couplings and, more particularly, to flexible couplings designed to permit normal operation of the flexible torque transmitting insert of such a coupling, while preventing free spin of a driven hub of the flexible coupling in the event of shearing, tearing, or other failure of the flexible insert.

Description of Related Art

Flexible couplings have long been used for the purpose of transmitting rotation from one shaft to another. Such couplings are normally used in order to accommodate comparatively minor shaft alignment problems such as are occasionally encountered because of manufacturing or assembly errors Certain particular flexible couplings have been manufactured in the past so as to include two hubs or hub elements which are adapted to be connected to the shafts joined by the coupling. These hubs are each provided with extending lugs, teeth, or ribs serving as holding means so as to be engaged by corresponding projections on a band-like or belt-like motion transmitting means in order to cause the hubs to rotate in synchronism as one of the shafts is rotated. The bands, belts of inserts used in these prior couplings have been flexible, somewhat resilient belts capable of being wrapped around the hubs so that the projections on them engage the holding means on the hubs.

A metal band or ring has typically been used to retain the belt in position wrapped around the hubs. The interior of the metal band is shaped and dimensioned so that the band may be slid axially relative to the hubs during the assembly and disassembly of the coupling so that the band fits over the belt when the coupling is assembled so as to conform closely to the exterior of the belt.

Some coupling designs have provided a pair of oppositely-disposed axial grooves in the outer surface of the belt and a pair of oppositely-disposed pins in the inner surface of the metal band. The pins are located so as to slide into the grooves as the metal band is installed along a line parallel to the axis of rotation of the hubs. The pins thus position the band and provide a degree of retention. However, if the shafts are grossly misaligned, the metal band will "walk-off" the belt, causing the coupling to come apart. The axial grooves have also been provided with an enlarged central portion such that the pins must be forced through the entrance of the axial groove and then "pop" into place in the central portion to give a tactile indication that the metal band is properly positioned with respect to the flexible belt.

Some prior coupling designs have also employed improved "lock-on" apparatus for improving the retention of the aforementioned metal retainer bands. This improved apparatus employs an axial groove for initially receiving a pin located on the underside of the metal retainer band and a circumferential groove opening into the axial groove and into which the retainer band pin may be rotated. In the embodiments, the axial groove is bisected by a radial line which also bisects one of the lobes or projections of the flexible belt. The circumferential groove is relatively short, typically having been selected to be two times the width of the retainer ring pin.

SUMMARY

The following is a summary of various aspects and advantages realizable according to various embodiments. It is provided as an introduction to assist those skilled in the art to more rapidly assimilate the detailed design discussion which ensues and does not and is not intended in any way to limit the scope of the claims which are appended hereto in order to particularly point out the invention.

In an illustrative embodiment, a flexible coupling apparatus comprises a first hub, a flexible plastic insert component, a second hub and a retainer component. The first hub, which may be a driving hub, is attachable to a first shaft and has an inner face. In one embodiment, the insert component, as a free standing component, has a plurality of exterior lobes and a plurality of interior lobes formed thereon and first and second faces disposed a selected axial width apart.

The second hub, which may be a driven hub, is attachable to a second shaft and has a cylindrical segment with a circular outer perimeter located adjacent an exterior lobe receiving portion which is shaped and dimensioned to slidably receive and engage the interior lobes of the flexible insert component. The lobe receiving portion of the second hub further comprises a plurality of wings terminating in a plurality of teeth, each tooth projecting a selected distance beyond a circular outer perimeter of the cylindrical segment of the second hub The retainer component is adapted to removably attach to the first hub and has a central opening including an interior lobe receiving portion shaped and dimensioned to slidably receive and engage the exterior lobes of the flexible insert. The retainer component further has an inner lip having an inner periphery comprising a plurality of radially arrayed openings, each radially arrayed opening being sized and positioned such that when the second hub and retainer component are assembled together, one of the plurality of teeth of the second hub resides centrally positioned between respective sides of each of said radially arrayed openings.

In an illustrative embodiment, the width of each radially arrayed opening and the width of each of said plurality of teeth are selected to enable the flexible insert to perform its normal torque transmission function during normal operation, while enabling the teeth and radially arrayed openings to engage in the event of tearing or shearing of the flexible insert so as to prevent entry of the second hub into free spin mode.

With the construction just described, if the flexible insert were to shear or tear during operation, for example, due to overload, the teeth of the wings of the second hub will engage the sidewalls of the radially arrayed openings in the inner lip of the retainer, thereby preventing the second (driven) hub from going into a free spin and thereby avoiding potentially damaging consequences.

BRIEF DESCRIPTION OF THE DRAWINGS

An illustrative embodiment of a flexible coupling will now be described in detail in conjunction with the drawings of which.

DETAILED DESCRIPTION OF PREFERRED EMBODIMENTS

Figure 1:
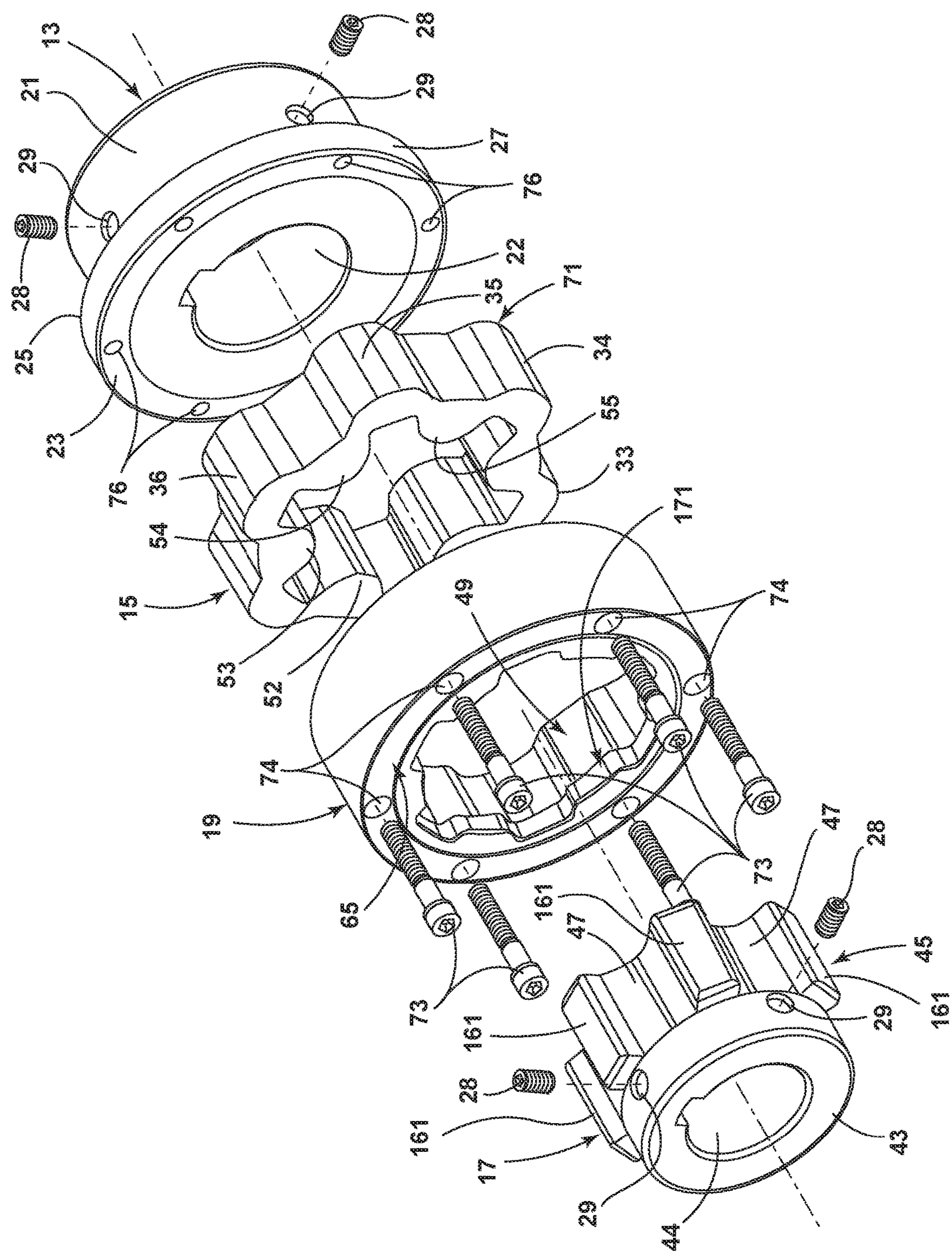
FIG. 1 is an exploded perspective view of a flexible coupling according to an illustrative embodiment.
Figure 3:
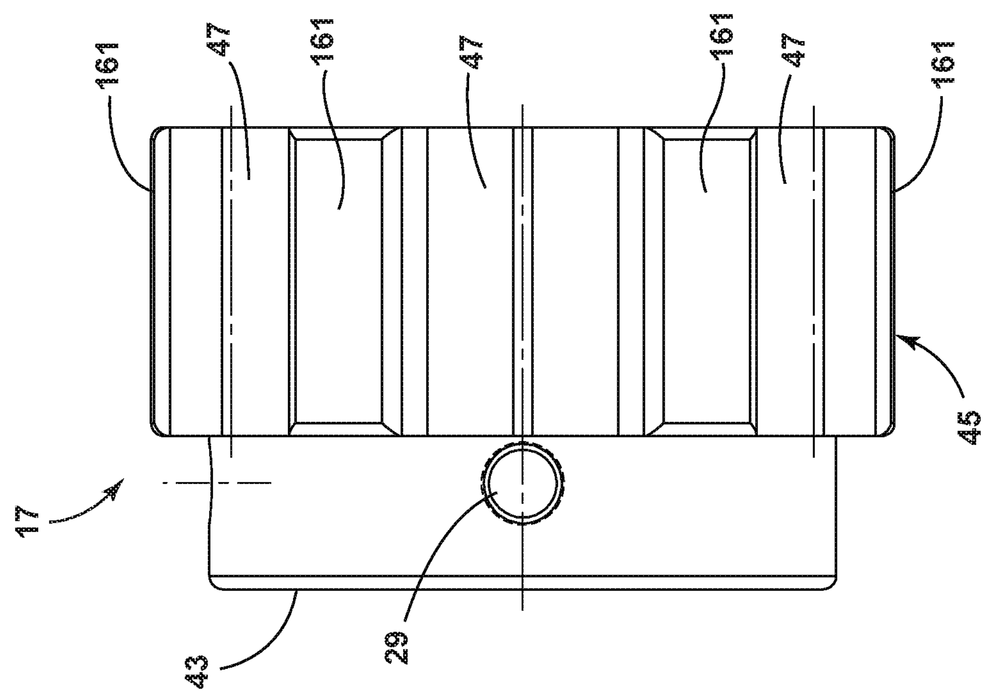
FIG. 3 is a side view of the hub component of FIG. 2.

An illustrative flexible coupling embodiment is shown in FIGS. 1-9. The flexible coupling of FIG. 1 includes a first hub 13, a flexible insert 15, a second hub 17 and a retainer component 19. In illustrative embodiments, the hubs 13, 17, and retainer 19 may be fabricated of steel or other suitable metals Flexible inserts such as flexible insert 15 typically have a characteristic shear strength, which when exceeded will cause the insert 15 to tear or break apart. In such case, a driven hub of a typical prior coupling will go into a "free spin' mode. If this driven hub were to be connected to drive an elevator, for example, the elevator would be free to drop as a result of the shearing of the flexible insert. The inventor has developed a coupling design which preserves the desirable sheer mode operation of flexible inserts during normal coupling operation while providing a mechanism for preventing the coupling from entering free spin mode in the event of tearing or shearing of the flexible insert. Thus, illustrative embodiments provide apparatus to prevent driven hubs from entering the free spin mode in the event of shearing or tearing of a flexible insert transmitting torque between driving and driven hubs.

In the illustrative embodiment, the first hub 13 includes an interior bore 22, a first cylindrical segment 21 and a mounting flange 27 having a circular outer edge 25. The face 23 of the flange 27 has a number of mounting holes 76 therein, each of which lies equally spaced on a circle of lesser diameter than that of the outer edge 25. Conventional fastening devices such as a screw 28 may inserted into openings 29 in the respective hubs 13, 17, to secure the hubs 13, 17 to respective shafts (not shown).

The insert 15 may be fabricated from a flexible material such as, for example, a suitable urethane, and is preferably split so as to facilitate "wraparound" installation. The outer surface 31 of the illustrative insert 15 features a number of equally spaced exterior lobes, e.g. 33, 34, 35, 36, projecting therefrom. In one embodiment, the exterior lobes, e.g., 33, are formed about equally spaced radii extending from the center of the insert 15. The interior surface of the illustrative insert 15 features a number of interiorly projecting lobes, e.g. 52, 53, 54, 55, which, in the embodiment of FIG. 1, alternate with the exterior lobes 33, 34, etc. In other words, as one proceeds about the circumference of the insert 15 one encounters a first exterior lobe, then an interior lobe, then a second exterior lobe, then a second interior lobe, etc.

The second hub 17 includes a cylindrical segment 43 and an insert-mounting segment or portion 45. The insert-mounting portion 45 includes a number of wells or receptacles 47 which are shaped and dimensioned to mate snugly with the interior lobes, e.g., 52, 53, of the insert 15. The second hub 17 is preferably machined as a unitary part from a single piece of metal stock, but of course could be constructed in various other fashions. The second hub 17 further includes an interior bore 44, typically of circular cross section dimensioned to receive a shaft of cooperating apparatus.

The interior 49 of the retainer 19 is specially contoured, shaped and dimensioned to receive and snugly mate with the exterior lobes, e.g., 33, 34, of the insert 15 when the coupling is in the assembled state. The retainer 19 has a first face 61 which receives and passes the insert 15 into mating position with the exterior lobes 33, 34, etc., and a second face which includes a depending edge or flange portion 65, which prevents the insert 15 from passing through the retainer 19, i.e., holds the insert 15 in a position wherein the insert 15 is preferably encased by the retainer 19.

In the embodiment illustrated, the width of the retainer 19 and the width of the insert 15 are selected such that the face 71 of the insert 15 lies flush with the edge of the first face 61 of the retainer 19, such that both the insert's face 71 and the edge 61 lie adjacent the flange face 23 in the assembled state. Thus, in assembly, the retainer 19 "captures" the insert 15 and is then attached to the first hub 13 via a number of fastening devices such as threaded bolts 73, which may pass through openings 74 in the retainer 19 and thread into openings 76 in the first hub 13.

In one embodiment, the width of the insert mating portion 45 of the second hub 17 is preferably selected such that its interior face terminates slightly short of the face of the insert 15. Thus, the second hub 17 does not protrude through the insert 15 or extend to a point where it might contact the flange face 23 of the first hub 13.

Figure 2:
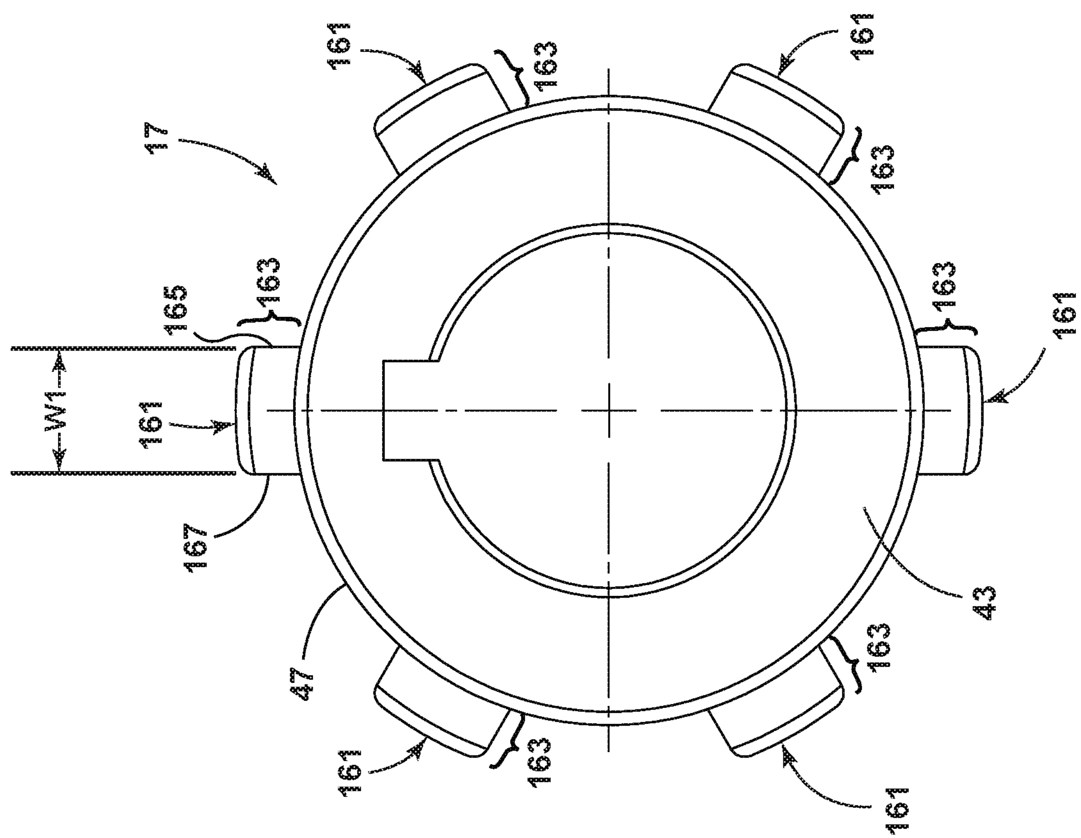
FIG. 2 is a front view of a hub component of the flexible coupling of the illustrative embodiment.
Figure 5:
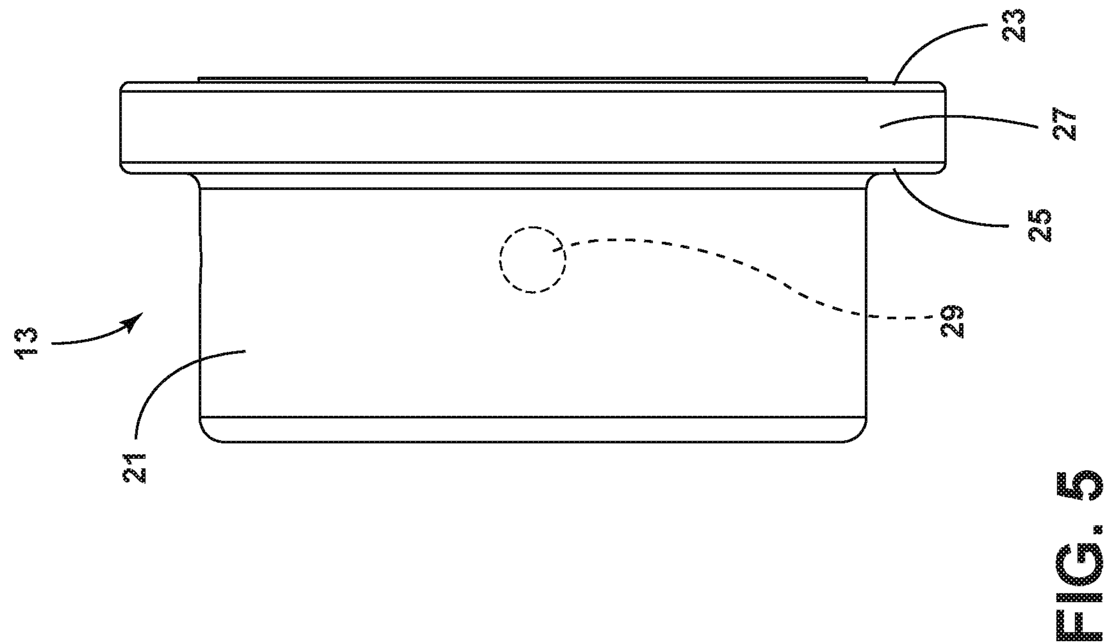
FIG. 5 is a side view of another hub component of the flexible coupling of the illustrative embodiment.

In an illustrative embodiment, the receptacles 47 of the second hub 17 are formed between respective pairs of radially arrayed wings 161, which, in an illustrative embodiment, are identically shaped and equally spaced about a circumference of the hub 17. As seen in FIG. 2, a top tooth portion 163 of each wing 161 projects a selected distance beyond the outer circumference of the cylindrical segment 43. In one embodiment, the teeth 163 may be identically shaped and may have generally parallel sides, e.g. 165, 167.

Figure 4:
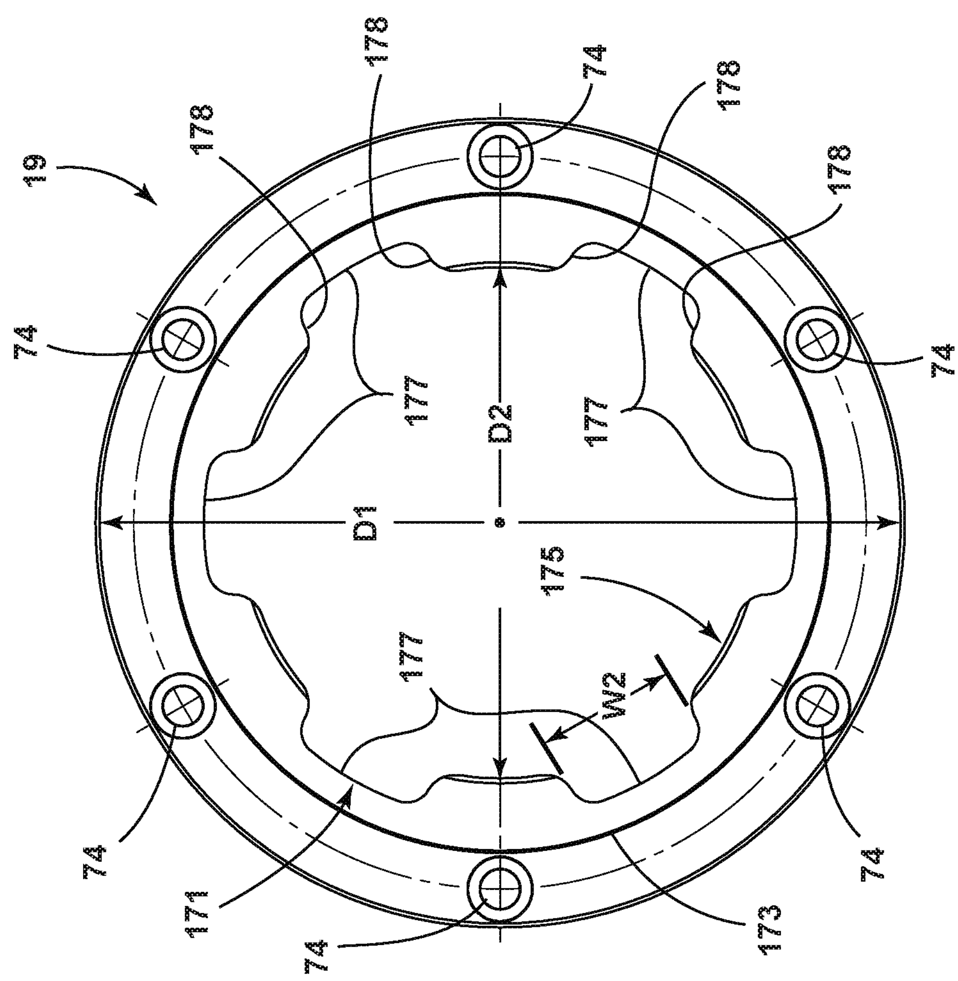
FIG. 4 is a front view of a retainer component of the flexible coupling of the illustrative embodiment.
Figure 7:
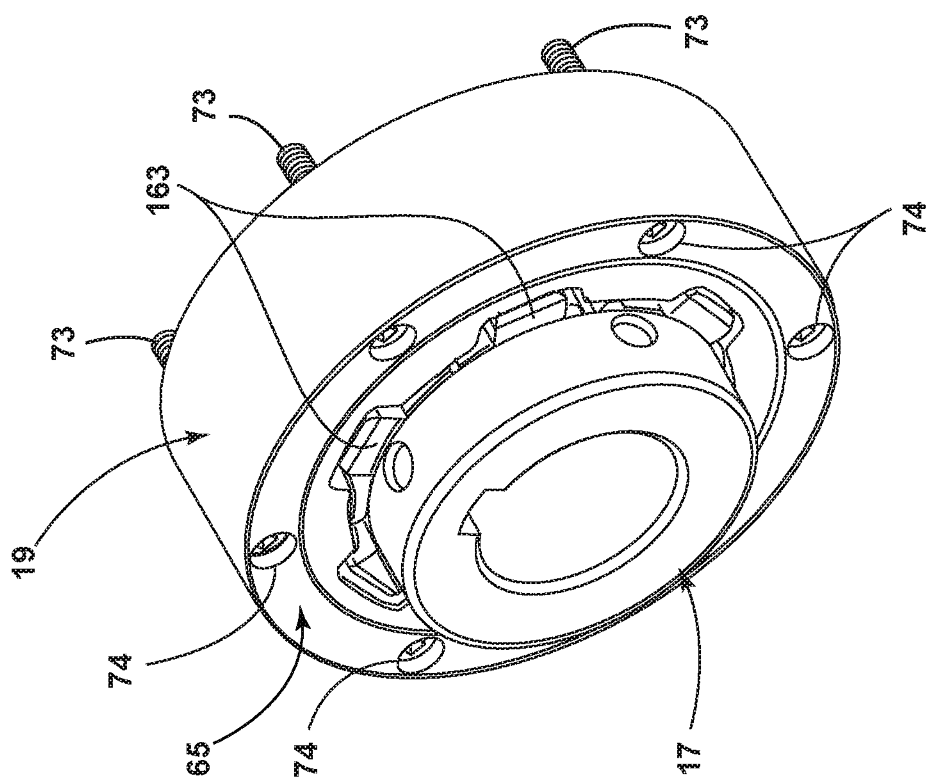
FIG. 7 is a perspective view of the apparatus of FIG. 6.
Figure 6:
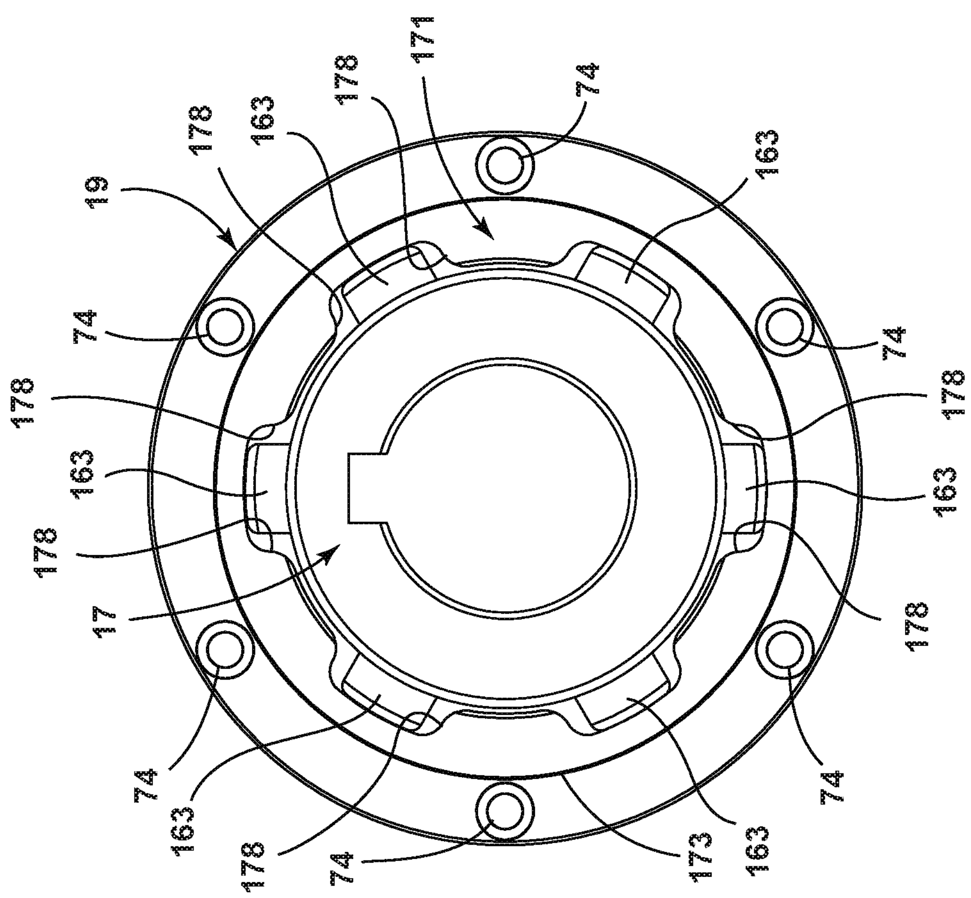
FIG. 6 is a front view of the hub component of FIG. 2, the retainer component of FIG. 4 and a flexible insert in an assembled state.
Figure 9:
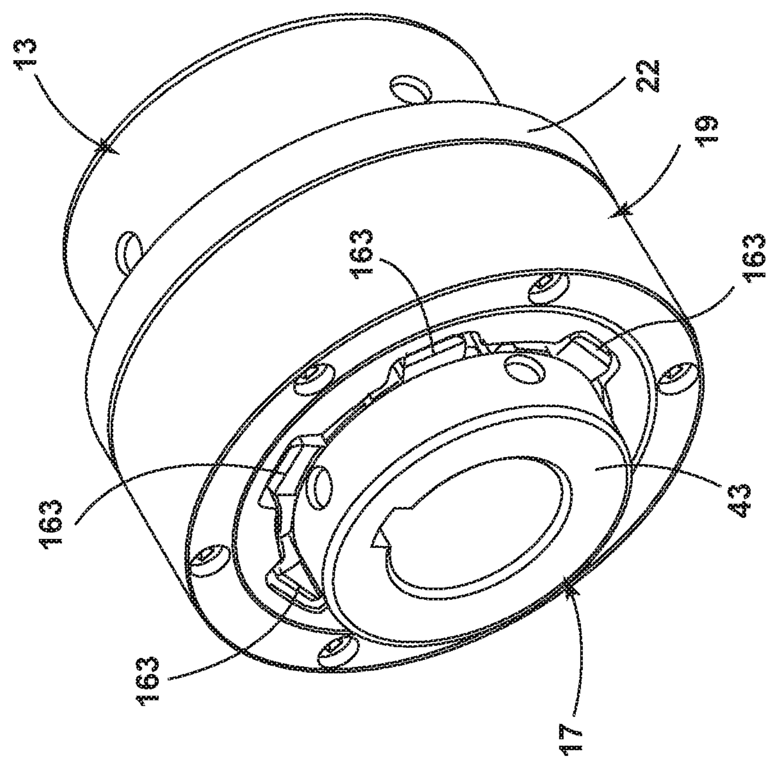
FIG. 9 is a perspective view of the flexible coupling of FIG. 1 in an assembled state.
Figure 8:
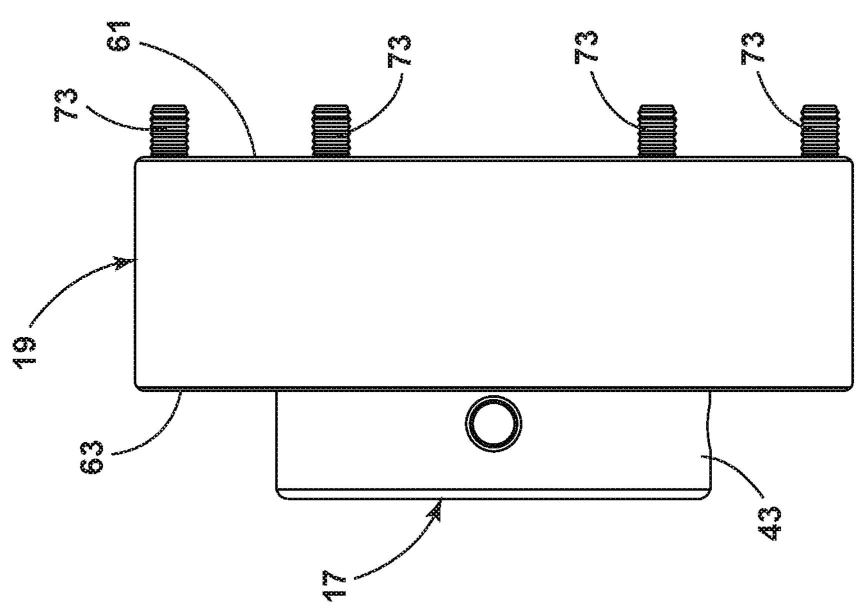
FIG. 8 is a side view of the apparatus of FIG. 6.

In the illustrative embodiment, and as particularly illustrated in FIG. 4, the retainer 19 has an inner lip 171 with an outer periphery 173. An inner periphery 175 of the inner lip 171 has a plurality of radially arrayed openings 177 formed therein. In the illustrative embodiment, these openings 177 are identically shaped and spaced such that, when assembled as shown, for example in FIGS. 6 and 7, a respective tooth 163 of each of the wings 161 is centrally positioned in each radially arrayed opening 177 with its parallel sides each displaced an equal distance from respective sidewalls, e.g. 178, of each radially arrayed opening 177.

In the illustrative embodiment, the width W1 (FIG. 2) of the tooth portion 163 of each wing 161 and the width W2 (FIG. 4) of each cooperating radially arrayed opening 177 are selected in a manner which enables the flexible insert 15 to operate in its normal manner during normal operation, while further enabling the tooth portions 163 and openings 177 to interact to prevent entry into free spin mode in the event of tearing or sheering of the flexible insert.

Thus, for example, in an illustrative embodiment where the diameter D1 of the retainer 19 is 3.960 inches and the diameter D2 of the inner periphery 175 is 2.500 inches, the widths W1 and W2 may be 0.375 inches and 0.700 inches, respectively, to enable the desired operation. Those skilled in the art will appreciate that flexible couplings often come in standard sizes ranging from small to large diameter couplings. Accordingly, for example, as the diameter of a retainer component of the illustrative couplings is increased, the widths W1 and W2 need to be accordingly adjusted to achieve the desired operation. Hence, those skilled in the art will appreciate that the specific dimensions provided above are illustrative only and will vary with various embodiments.

With the construction just discussed and assuming that the first hub 13 is the driving hub and the second hub 17 is the driven hub, if the insert 15 were to shear or tear during operation, for example, due to overload, the teeth 163 of the wings 161 will engage the sidewalls 178 of the openings 177 in the inner lip 171 of the retainer 19, thereby preventing the second hub 17 from going into a free spin and thereby avoiding potentially damaging results.

In overall operation of the coupling in the assembled state, the insert 15 is snugly encased and transmits torque and absorbs minor misalignment without exerting axial thrusts on the cooperating shafts to which the first and second hubs 13, 17 are respectively attached. Thus, the insert 15 does not tend to exert forces on the hubs 13, 17 tending to move them parallel to the central axis of rotation of the coupling in typical applications. Such forces may cause a hub to move, for example, 15 thousandths of an inch, which is undesirable or unacceptable in certain applications.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. A flexible coupling apparatus comprising:

a first hub for attachment to a first shaft and having an inner face;

a flexible insert component comprising an annular body having a plurality of circumferentially-spaced exterior lobes extending from an outer face thereof and a plurality of circumferentially-spaced interior lobes extending from an inner surface thereof, said insert component further having first and second faces disposed a selected axial width apart;

a second hub for attachment to a second shaft and having a cylindrical segment with a circular outer perimeter located adjacent an exterior lobe receiving portion, the exterior lobe receiving portion being shaped and dimensioned to engage the interior lobes of said insert component, the exterior lobe receiving portion comprising a plurality of circumferentially spaced wings terminating in a plurality of teeth, each tooth projecting a selected distance beyond the circular outer perimeter of said cylindrical segment; and a retainer component adapted to removably attach to said first hub and having a central opening including an interior lobe receiving portion shaped and dimensioned to slidably receive and engage the exterior lobes of said insert component through a first side of said retainer component configured to abut said first hub, the retainer component further having an annular lip disposed at a second side thereof, axially-offset from the interior lobe receiving portion-with a plurality of circumferentially-spaced radially arrayed openings formed therein, each radially arrayed opening having oppositely disposed sidewalls and being sized and positioned such that when the retainer component and the second hub are assembled together, one of the plurality of teeth of said second hub axially extends within each of said radially arrayed openings spaced apart from the respective sidewalls of the respective opening; and the central opening in said retainer component sized such that said second hub is passable therethrough to a position wherein said plurality of teeth of said second hub engage said interior lobes of said insert component and said interior lobe receiving portion of said retainer component engage said exterior lobes.

2. The apparatus of claim 1 wherein a width of each radially arrayed opening and a width of each of said plurality of teeth are selected to enable the flexible insert component to perform a normal torque transmission function during normal operation, while enabling the teeth and openings to engage in the event of tearing or shearing of the flexible insert component so as to prevent entry of the second hub into free spin mode.

3. The apparatus of claim 1 wherein a width of the retainer component and the axial width of the insert component are selected such that said retainer component encases said insert component.

4. The apparatus of claim 3 wherein during assembly of the apparatus, the retainer component captures the insert component and is then attached to the first hub.

5. The apparatus of claim 4 wherein a width of an insert mating portion of the second hub is selected such that an interior face thereof terminates short of the first face of the insert component whereby the second hub does not protrude through the insert component to a point where it might contact a flange face of the first hub.

6. The apparatus of claim 1 wherein the insert component exhibits a constant shear section width.

7. The apparatus of claim 1 wherein the insert component includes a split to provide for wraparound installation.

8. The apparatus of claim 7 wherein said split is formed in one of said exterior lobes.

9. The apparatus of claim 1 wherein a clearance between a side face of the insert component and an interior edge of the retainer component and a clearance between respective opposing faces of said first and second hubs are selected to provide free axial float.

10. A four component coupling apparatus comprising;

a first component comprising a first hub for attachment to a first shaft and having an inner face;

a second component comprising a flexible insert component comprising an annular body having a plurality of circumferentially-spaced exterior lobes extending from an outer face thereof and a plurality of circumferentially-spaced interior lobes extending from an inner face thereof, said insert component further having first and second faces disposed a selected axial width apart;

a third component comprising a second hub for attachment to a second shaft and having a cylindrical segment with a circular outer perimeter located adjacent an exterior lobe receiving portion, the exterior lobe receiving portion being shaped and dimensioned to engage the interior lobes of said insert component, the exterior lobe receiving portion further comprising a plurality of circumferentially-spaced wings terminating in a plurality of teeth, each tooth having first and second sides and projecting a selected distance beyond the circular outer perimeter of said cylindrical segment; and a fourth component comprising a retainer component adapted to removably attach to said first hub and having a central opening including an interior lobe receiving portion shaped and dimensioned to slidably receive and engage the exterior lobes of said insert component through a first side of said retainer component configured to abut said first hub, the retainer component further having an annular lip disposed at a second side thereof, axially-offset from the lobe receiving portion with a plurality of circumferentially-spaced radially arrayed openings formed therein, each radially arrayed opening having oppositely disposed side surfaces and being sized and positioned such that when said third and fourth components are assembled together, one of the plurality of teeth of said second hub resides in each of said radially arrayed openings with its first and second sides lying adjacent and spaced apart from the respective side surfaces of the respective radially arrayed opening; and said first hub, second hub, retainer and insert component being alignable with respect to one another along a common horizontal axis, said retainer component being movable along said horizontal axis such that said flexible insert component enters the interior of said retainer component and said exterior lobes come into engagement with the interior lobe receiving portion of said retainer component; said first side of said retainer component thereafter coming into abutment with said inner face of said first hub; and said second hub being movable along said axis such that each of said plurality of teeth enter the interior of said flexible insert component and come into engagement with said interior lobes.

11. The apparatus of claim 10 wherein said interior lobes alternate with said exterior lobes such that, as one proceeds about a circumference of said insert component one encounters a first exterior lobe, then an interior lobe, then an exterior lobe, then an interior lobe in repeating fashion.

12. The apparatus of claim 10 wherein a width of each radially arrayed opening and a width of each of said plurality of teeth are selected to enable the flexible insert component to perform a normal torque transmission function during normal operation, while enabling the teeth and openings to engage in the event of tearing or shearing of the flexible insert component so as to prevent entry of the second hub into free spin mode.

13. A flexible coupling apparatus comprising:

a first hub for attachment to a first shaft and having an inner face;

a flexible insert component comprising an annular body having a plurality of circumferentially-spaced exterior lobes extending from an outer face thereof and a plurality of circumferentially-spaced interior lobes extending from an inner face thereof, said insert component further having first and second faces disposed a selected axial width apart;

a retainer component adapted to removably attach to said first hub and having a central opening including an interior lobe receiving surface shaped and dimensioned to slidably receive and engage the exterior lobes of said insert component through a first side of said retainer component configured to abut said first hub, the retainer component further an annular lip disposed at a second side thereof, axially-offset from the interior lobe receiving surface with a plurality of circumferentially-spaced radially arrayed openings formed therein;

a second hub for attachment to a second shaft and having a cylindrical segment with a circular outer perimeter located adjacent an exterior lobe receiving portion, the exterior lobe receiving portion being shaped and dimensioned to engage the interior lobes of said insert component, the lobe receiving portion comprising a plurality of circumferentially-spaced wings terminating in a plurality of radially arrayed teeth, each radially arrayed tooth projecting a distance beyond the circular outer perimeter of said cylindrical segment, the distance being selected such each radially arrayed tooth axially extends within a respective one of said radially arrayed openings of the retainer component when the retainer component and the second hub are assembled together; and the central opening in said retainer component sized such that said second hub is passable therethrough to a position wherein said plurality of teeth of said second hub engage said interior lobes of said insert component and said interior lobe receiving surface of said retainer component engages said exterior lobes.

14. The flexible coupling apparatus of claim 13 wherein when the hub and retainer component are assembled together, each radially arrayed tooth has respective sidewalls disposed adjacent and spaced apart from respective sidewalls of the respective radially arrayed opening within which it axially extends.

15. The flexible coupling apparatus of claim 13 wherein each of the plurality of radially arrayed openings of the retainer component lies adjacent the interior lobe receiving surface of the retainer component.

16. The apparatus of claim 13 wherein a width of each radially arrayed opening and a width of each of said plurality of teeth are selected to enable the flexible insert component to perform a normal torque transmission function during normal operation, while enabling each of the radially arrayed teeth to engage with its respective radially arrayed opening in the event of tearing or shearing of the flexible insert component so as to prevent entry of the second hub into free spin mode.

* * * * *